US006654947B1

(12) United States Patent
North et al.

(10) Patent No.: US 6,654,947 B1
(45) Date of Patent: Nov. 25, 2003

(54) METHOD AND SYSTEM FOR CREATING DYNAMIC INTERFACES USING A GENERAL CONTROL CONTAINER

(75) Inventors: Stephen Charles North, Lebanon, NJ (US); Gordon Charles McNeal Woodhull, Brooklyn, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/470,796

(22) Filed: Dec. 23, 1999

Related U.S. Application Data

(60) Provisional application No. 60/113,392, filed on Dec. 23, 1998.

(51) Int. Cl.[7] .............................................. G06F 9/44
(52) U.S. Cl. ..................... 717/101; 717/106; 717/116
(58) Field of Search ......................... 717/168, 101–103, 717/174–178, 114, 116, 106–108; 345/700, 744, 733–759; 709/313, 315, 316

(56) References Cited

U.S. PATENT DOCUMENTS

| 6,175,364 B1 | * | 1/2001 | Wong et al. ................ 345/763 |
| 6,182,278 B1 | * | 1/2001 | Hamada et al. ............. 717/107 |
| 6,195,794 B1 | * | 2/2001 | Buxton ....................... 717/108 |
| 6,380,954 B1 | * | 4/2002 | Gunther ..................... 345/764 |
| 6,418,554 B1 | * | 7/2002 | Delo et al. .................. 717/174 |

OTHER PUBLICATIONS

Blakeley. OLE DB: A Component DBMS Architecture. IEEE. 1996. pp. 203–204.*

Blakeley. Data Access for the Masses Through OLE DB. ACM. 1996. pp. 161–172.*

* cited by examiner

*Primary Examiner*—Wei Zhen

(57) ABSTRACT

The present invention discloses a convenient framework for container applications and controls. A customizable embeddable container is provided, and client objects of the container may be positioned dynamically by an external layout agent. The container manages toolbars and user interface modes, integrating disparate components into a single consistent interface. Group repositories of related objects for data transfer operations such as cut-and-paste, drag-and-drop, save-and-load, can be supported. The present invention advantageously does not rely on large external libraries and, thus, is relatively lightweight.

1 Claim, 13 Drawing Sheets

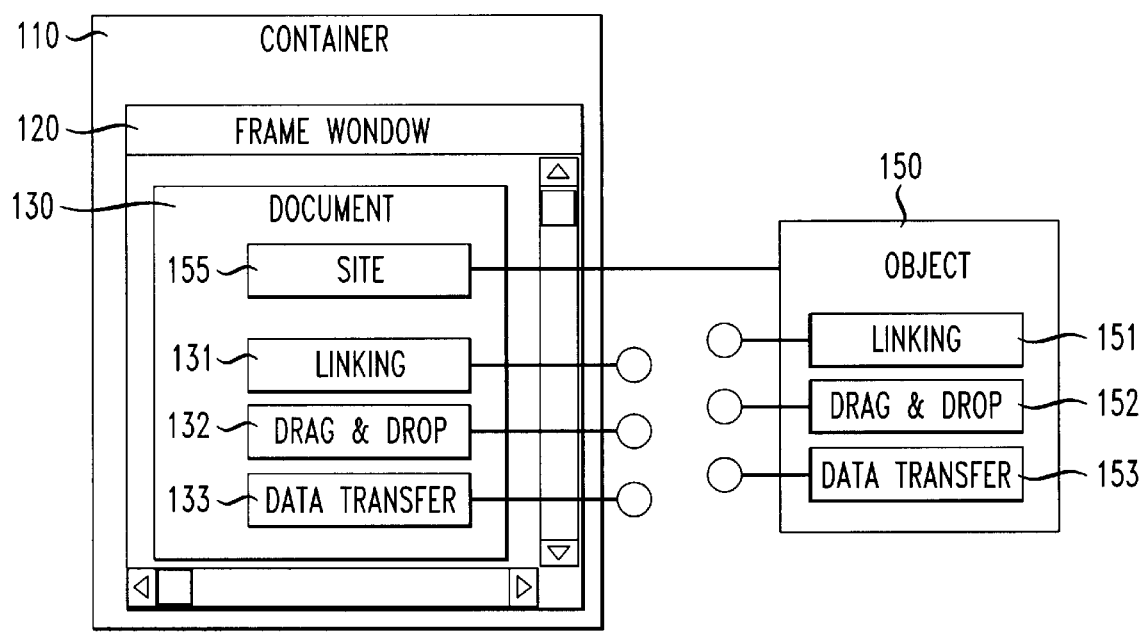
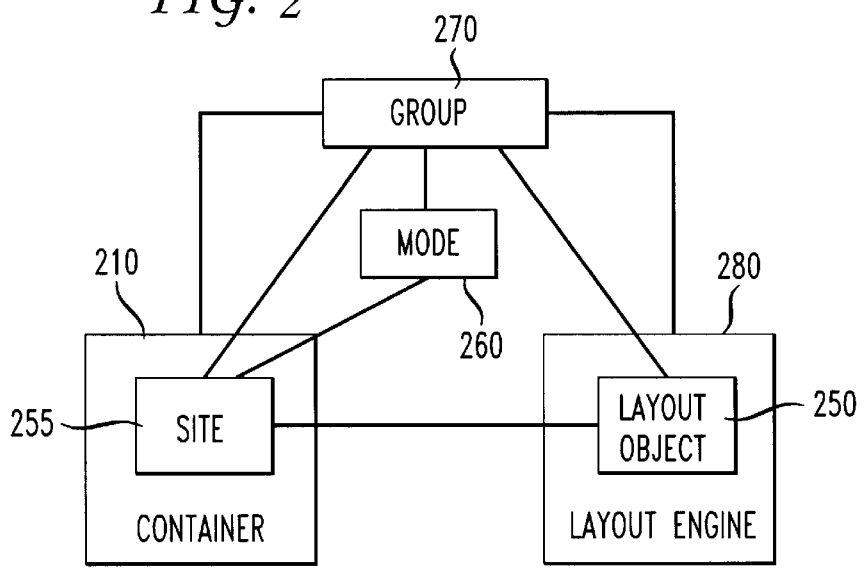

FIG. 10

```
CComPtr<IUnkown> pControl;
CComPtr<IMCCSite> pSite;
// create site in main
layerRUN(m_cont-
>new_Site (&pSite));RUN(pSite-
>put_Layer(m_main));
// create control
RUN(CoCreateInstance(CLSID_CShap
eNodeCtl,0,CLSCTX_ALL,
         IID_Unknown,(void**)&pCo
ntrol));// size it.if(hasSize)
if(qi (IOleObject) oo = pControl)
         oo-
>SetExtent(DVASPECT_CONTENT,&siz
e);
// create layout node
CComPtr<IDNode> pNode;
RUN(m_eng->new_Node(&pNode));
// Create connector & init.
CComPtr<IDGMConnector> pConnect;
Run)CoCreateInstance(CLSID_DGMNo
deConnector,NULL,CLSCTX_INPROC_S
ERVER,
         IID_IDGMConnector, (void
**)&pConnect));
RUN(qi(INeedOnePointer) (pConnect
)->TakePointer(pNode));
RUN(qi(IObjectWithSite) (pConnec
)->SetSite(site));
// set position.
CComPtr<IMCCTransform> t;
RUN(m_cont->get_Transform(&t));
POINTL ptVirt;
RUN(t->W2CP(pt,&ptVirt));
RUN(pNode-
>put_Pos(pointf(ptVirt)));
// prob. just connector is
sinked by now, but you never
know.
RUN(intend(site,MCCS_SHOWN));
```

FIG. 12B
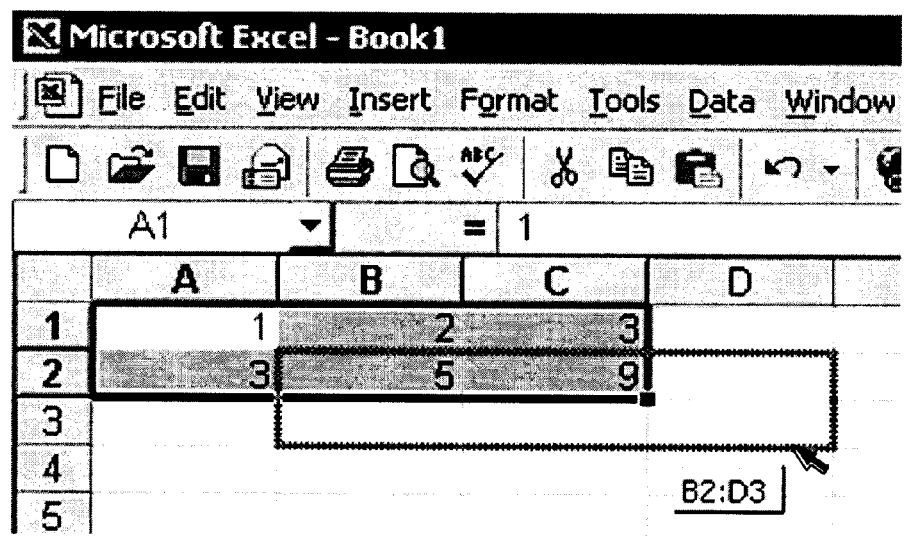
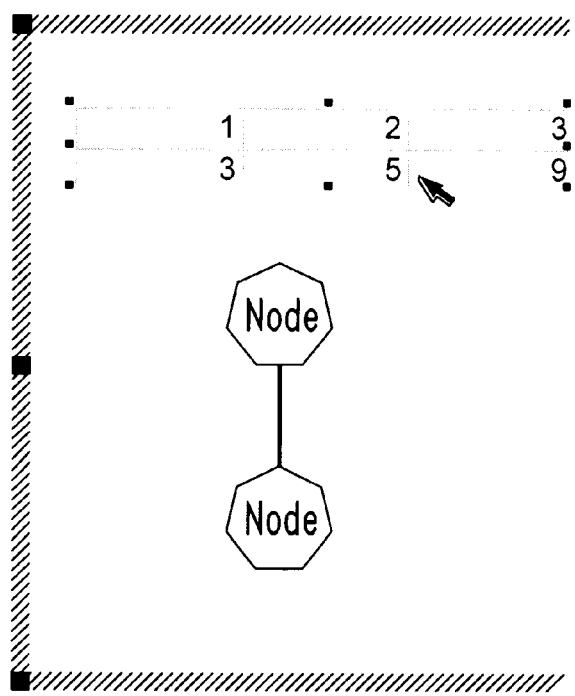

FIG. 12C
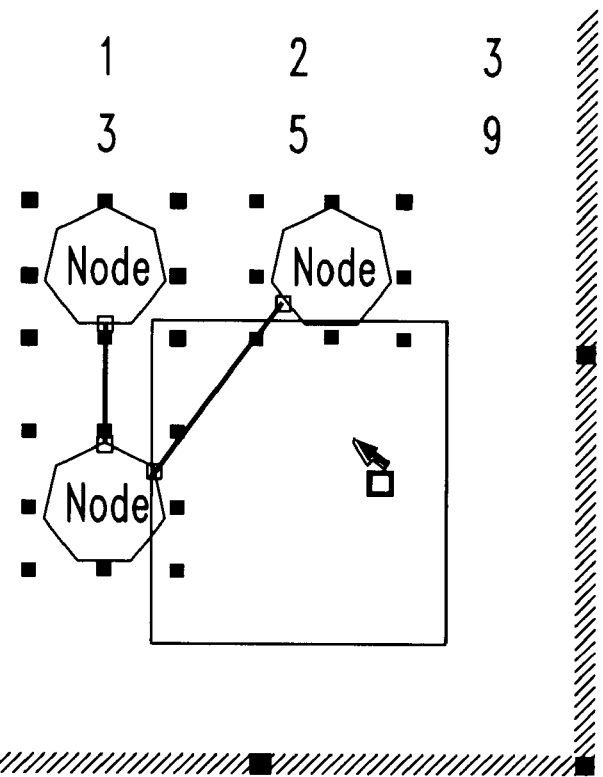
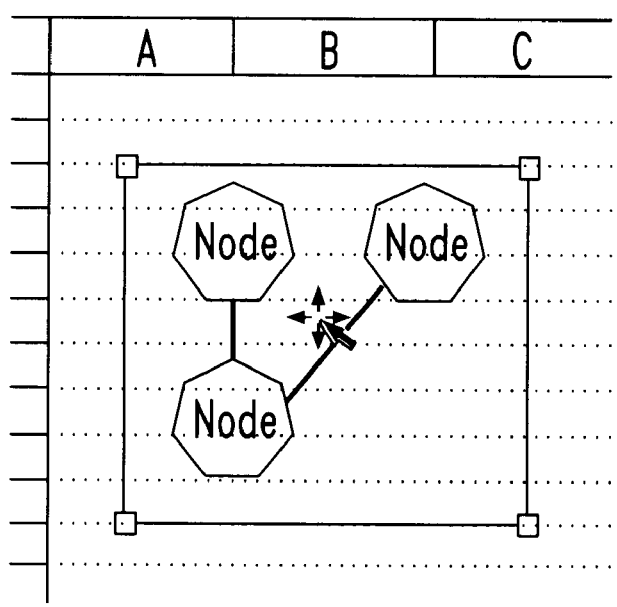

METHOD AND SYSTEM FOR CREATING DYNAMIC INTERFACES USING A GENERAL CONTROL CONTAINER

CROSS REFERENCE TO RELATED APPLICATIONS

This application claims priority to Provisional Application Serial No. 60/113,392, filed on Dec. 23, 1998, the content of which is incorporated by reference herein.

FIELD OF THE INVENTION

The present invention relates generally to object-oriented computer programming, and, more particularly, to methods and systems for designing containers for use in compound document applications.

BACKGROUND OF THE INVENTION

Compound document technology, such as Microsoft's Object Linking and Embedding ("OLE"), is notoriously difficult to develop and utilize. A compound document is an application environment containing program objects that can be interlinked and interacted with by a user. For example, FIG. 1 sets forth an OLE container application 110, such as a word processor (e.g. Microsoft Word) or web browser (e.g. Microsoft Internet Explorer), which can contain objects 150 imported from other applications. The components are integrated using Microsoft's proprietary framework known as the Component Object Model or COM. COM and OLE (or its current incarnation known as ActiveX) originated as an inter-client cut-and-paste protocol, but have grown to include many advanced services, including object naming, in-place editing, canvas event management (e.g. resize, drag-and-drop), toolbar and menu sharing, and loading and saving of persistent state.

OLE/ActiveX provides support for what it calls automation services which allow components to be controlled through public COM interfaces. An automation object (a/k/a "server") implements and publishes interfaces; an automation controller (a/k/a "automator" or "client") calls methods in these interfaces. ActiveX also supports more sophisticated components called ActiveX controls (a/k/a OCXs or OLE Custom Controls) which are editable embedded objects that can also transform user actions into notification events sent to the container. Standard development tools have simplified the design of contained objects such as ActiveX controls. In 1996, Microsoft drafted a new specification called OCX96 which, inter alia, provided support for windowless, non-rectangular and transparent controls.

On the other hand, the process of creating a new container application fully supporting such objects remains difficult at best, complicated by the feature-rich nature of ActiveX. OLE does not provide a standard container implementation; rather it is more accurately described as a contract between applications. As illustrated by FIG. 1, a container application must provide support for a multiplicity of interfaces (e.g. to support linking, drag-and-drop, data transfer) in order to handle a wide range of components. The hierarchical model of the OLE architecture complicates matters: there is no support in the persistence and naming scheme for connections between objects in a system without one object owning the other or another owning both. Moreover, OLE allows only one active object to negotiate with the container for toolbar and menu space. The protocol simply does not include support for many of the issues that arise when a system is composed of heterogeneous components.

Although some of the complexity of programming in OLE can be encapsulated using a class library such as Microsoft Foundation Classes (MFC), support is not provided for all of the functions that are in the raw OLE API—especially newer features such as windowless controls. Accordingly, a new container-object architecture is needed that reduces the development time required for creating a general container application and which does not rely on large external libraries.

SUMMARY OF THE INVENTION

The present invention discloses a convenient framework for container applications. A customizable embeddable container is provided, and client objects of the container may be positioned dynamically by an external layout agent. The container manages toolbars and user interface modes, integrating disparate components into a single consistent interface. Group repositories of related objects for data transfer operations such as cut-and-paste, drag-and-drop, save-and-load, can be supported. The present invention advantageously does not rely on large external libraries and, thus, is relatively lightweight.

The accordance with an embodiment of the present invention, the GUI is separated from the dynamic layout engine. A generic user interface component is provided for creating nested applications/components. A protocol for user interface "modes" is disclosed, as well as object repositories that support the common data transfer operations (load, save, cut, paste, drag, drop) while preserving links between the objects; hooks for dynamic object layout; menu sharing between active objects through simple call-outs and data structures; and toolbar management through a shared container object that represents the toolbar area. Unlike a typical application container, all document semantics have been factored out. In addition, the present invention permits far more convenient support for toolbars and data transfer.

These and other advantages of the invention will be apparent to those of ordinary skill in the art by reference to the following detailed description and the accompanying drawings.

BRIEF DESCRIPTION OF THE DRAWINGS

FIG. 1 is a diagram of a prior art container application.

FIG. 2 is a diagram of a container application in accordance with an embodiment of the present invention.

FIG. 10 is sample automator code that inserts a node into a graph in the Dynagraph application.

FIGS. 11, 12A, 12B, and 12C are screenshots illustrating operation of the Dynagraph application.

DETAILED DESCRIPTION

Figure 3:
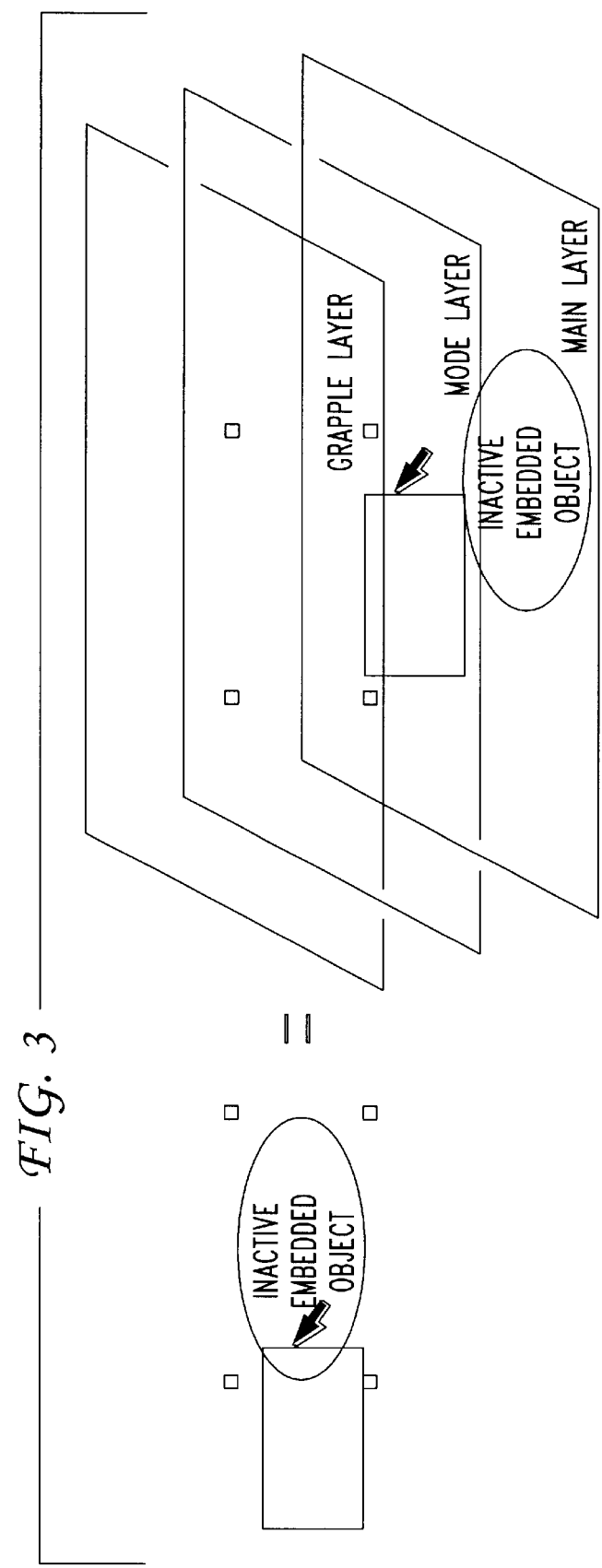
FIG. 3 illustrates a selection operation in accordance with an embodiment of the present invention.

FIG. 1 sets forth a diagram of a container application in accordance with a preferred embodiment of the present invention. Contained boxes represent objects that share memory; lines represent communication over COM interfaces. Container 210, unlike a standard OLE container application, does not provide a built-in user interface: it has no support for features like drag-and-drop or data transfer. All interaction, layout, coordinate transformation (e.g. zoom, etc.), and persistence, have been factored out, leaving a z-ordered list of positioned content objects at various levels of activation. The layout engine 280, user interface modes 260 (further described below), and storage systems are considered external clients with no privileged access to container data. The client objects use ActiveX Automation to communicate with the container over its public interfaces. The design advantageously permits easy replacement of most non-core parts of the application and also allows fine control over its functionality from any Automation-compatible language, including C++, Java, Visual Basic, and Web scripting languages such as JScript and VBScript.

Container 210, like any OLE container, can contain objects and provide embedded storage or a persistent link pointer in the form of a moniker for every server object associated with it. For each such object 250, the container has a site object, e.g. 255, which represents the relationship between the container and the contained object. The site's properties include position, a reference to the contained object/control, and ambient properties such as default colors and fonts. Accordingly, layout in OLE centers on the site object. However, standard OLE does not define any interfaces to change these properties. In other words, container functionality can be divided into fetches, requests, and commands, but OLE only defines interfaces for the first two. Standard OLE does offer ways to give hints to containers, but policies about layout and activation are generally hidden.

In contrast, the present invention pushes policy decisions out of the container. In standard OLE, the container is expected to make policy decisions about layout, activation, selection, etc. Container 210 is designed to make no policy decisions; it delegates the decisions to installed components. It exposes all properties, such as position, and defines interfaces for clients to directly change site properties. When a component in the system does not want to set policy itself (e.g. set absolutely the position of the site) it fires a request event on the object. Components which do set policy sink these events and determine the correct absolute changes to make. In this model, clients make hints or issue requests by treating them as events sent to sites. For example, in order to support layout control by a central server, the present architecture can specify that automators such as mode 260 that need to change a layout do this by generating events on the affected objects' sites 255 rather than making changes directly. If a sink picks up an event, it changes the layout; otherwise an automator is free to make the change itself. In effect, the site has an "owner" (which may be the control itself) that interprets all requests made on the site, usually forwarding them to a layout engine 280.

1. Modes and Toolbars

The control container object 210 above advantageously has no built-in user interface and no data transfer capabilities. It was designed to be a general control container and, accordingly, does not respond to user input events on its own.

Applications add a user interface to the container by adding controls plugged in as either toolbars or what the inventors call "modes" which provide the main interface.

Modes. "Modes" are transparent windowless objects that lie in front of the data and respond to user input such as mouse and keyboard actions. For example, with reference to the example application set forth in FIG. 9 and described in further detail below, it is helpful to define an "Edit" mode for selecting, moving, transferring, and deleting objects, and a "View" mode that activates all contained items simultaneously. The Edit mode can make use of data transfer components that retrieve embeddings from OLE data objects and others that serve as OLE wrappers for application data. The user interface objects can be layered so that user input actions pass from actively contained objects to grapples (selection/activation/sizing borders) to modes. The items in the main layer do not see the mouse because they are inactive. FIG. 3 illustrates a selection operation. The "Edit" mode is in charge of the mouse and is displaying a selection rectangle. The act of selection causes grapples to appear in the layer above.

Modes receive all mouse events that the active contained objects do not process on their own. For example, a left mouse button drag in the Windows operating system consists of the message, WM_LBUTTONDOWN, multiple WM_MOUSMOVE messages, and a WM_LBUTTONUP message. If an active windowed control is under the mouse, Windows routes these messages directly to it (for instance resulting in the selection of text in a Word document). Otherwise, the messages go to the container window, which searches the Z order for the control under the mouse and forwards the messages. If there is no active object in front of it, the active mode will then receive the messages through the OCX96 interface IOleInPlaceObjectwindoWless. If the mode interprets the drag as a move, it then asks the container what control is below it at the coordinates of the WM_LBUTTONUP, and generates the event IMCCSiteOwner::Move on the site or calls IMCCSite::put_Rect itself if there are no sinks for that event.

The design of the user interface as contained controls is a strategy to ensure that the architecture is as open as possible. All of the modes use only the public interfaces to manipulate the control container. Some of the container's internal calculations, such as "find control at point," are exposed as public methods, and the control container provides a utility object to simplify some of the common, bulky cumbersome operations of modes such as data transfer.

In a typical application, multiple modes are active concurrently. ActiveX defines two levels of activation: "in-place" and "UI". In-Place activation only allows an object to receive mouse messages; a mouse message "falls" through any mode (or other windowless control) that does not catch it. UI activation provides for toolbar, menu, and keyboard sharing, but unfortunately only defines negotiation between a container and one contained object. Presumably, it would be much harder to negotiate between three or more graphic interfaces. In the typical case of the present invention, however, it can be assumed that concurrently active objects have been designed compatibly. So, an additional protocol for Cooperative UI ("CoUI") activation can be defined. In CoUI activation: (a) keyboard messages fall through interested objects in the same way as mouse messages; (b) objects get a chance to add to the menu negotiated with the container of the control container, and register to receive callbacks from their additions; (c) the toolbar is exposed as a resource for all aware objects.

Toolbars. To support toolbars, the control container can be activated "into" another window, typically the frame window of its container. Two auxiliary controls can be used to round out toolbar functionality. A "toolbar" control can provide familiar grab handles around any ActiveX control and can be floated. A "toolback" control can provide the blank space on which toolbars can be arranged. Toolbars use the same layout architecture as graphs: moves initiated with the mouse get translated into requests to a toolbar layout engine, which ensures that toolbars don't pile up, while keeping them fairly close to where the user places them.

2. Persistence and Data Transfer

Figure 4:
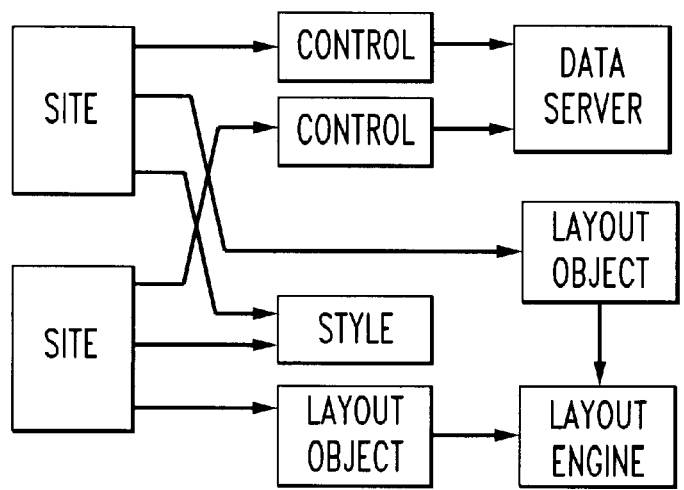
FIG. 4 is a diagram illustrating a non-hierarchical group of objects.

A persistence model is required that can preserve the connections between components across in both "save/load" and "copy/paste" situations. Persistence of a collection of linked heterogeneous components requires some way to save the references between objects. The hierarchical persistence protocols provided by ActiveX make it possible for objects to create and initialize other objects, but there is no general way to connect objects not in a hierarchy. See FIG. 4.

Figure 5:
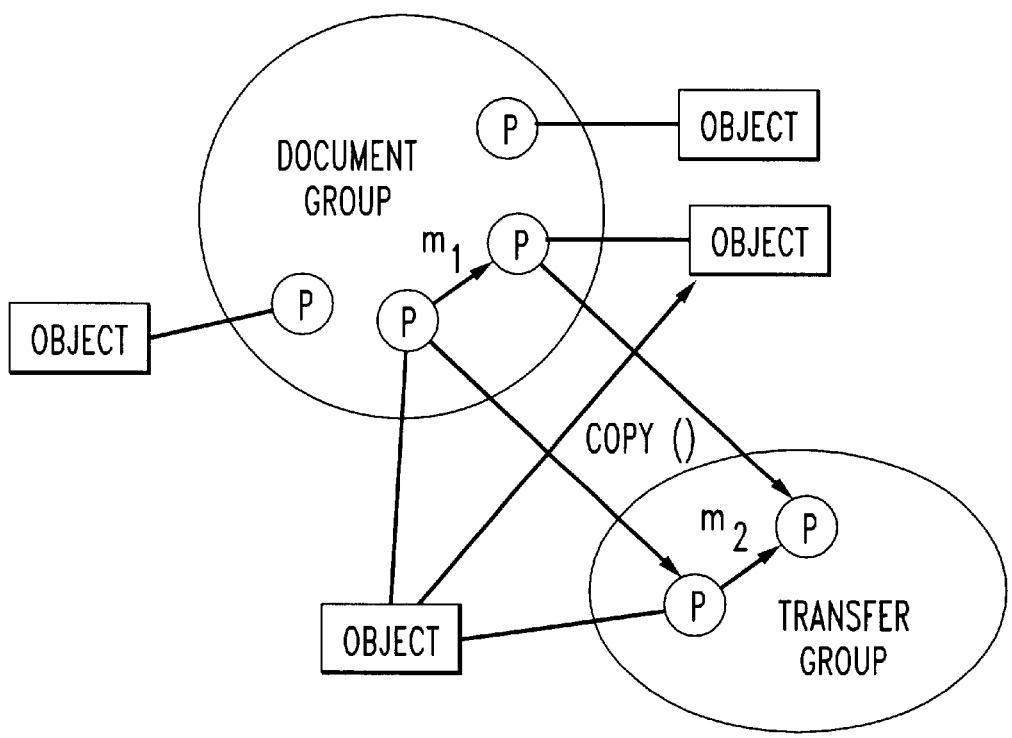
FIG. 5 illustrates group persistence in accordance with an embodiment of the present invention.

In accordance with an embodiment of the present invention, a new storage type called a "group" is defined which preserves the non-hierarchical connections between components. A group is basically a repository for a set of components identified by OLE monikers that either represent the name of the component or a code to identify an anonymous component. Typically, named components are part of a configuration, and anonymous components make up the data (contents) of the document. Any component that needs to be (re-) connected to others has a storage manager called a "persistor" for each group it belongs to. In addition to saving and relinking the connections from its subject, the persistor also controls the way it gets copied from group to group in transfer operations such as drag-and-drop and cut-and-paste. When a persistor copies itself to a new group, it drags any other items it has monikers to along with it. See FIG. 5. Items in a group never get replaced—if a name already identifies an item in a group, it is assumed to be compatible with items of the same name in other groups. This allows a transfer from one Montage instance to another to copy only the data—the configuration the data relies on only gets copied if the destination does not have it. A mapping system ensures that anonymous items get copied only when they are actually new to a group.

Persistors implement the interface IGroupItem, which allows them to control the way they are copied from group to group and to make sure any connected objects are copied as well. Since the persistors pull objects from group to group as necessary, drag-and-drop and cut-and-paste are fairly simple operations: the initiator of the transfer (usually a mode) creates a new group and pastes all objects to be transferred into the new group with IGroup::Paste. Then it saves the group to a storage object, and wraps the storage object in an ActiveX-compatible data object for the operating system. The destination of the transfer retrieves the group and pastes the objects into its own group to complete the transfer. Data transfer between an application using the present invention and another application is also straightforward, as the ActiveX format negotiation protocol defines a standard for embedded objects. Container 210 supports the standard "embedded" format, so items can be dragged from the container into another application and be embedded as a new instance of the container application. Instead of transferring names (that the client will know nothing about), the client loads the data as a complete object. Similarly, if the user drags an object from another application onto the canvas of the present invention, modes can accept this drop in the embedded object format as a new contained item, though they know nothing about the source application. (For example, Graph Draw Mode embeds an object as a new layout node.)

Figure 6A:
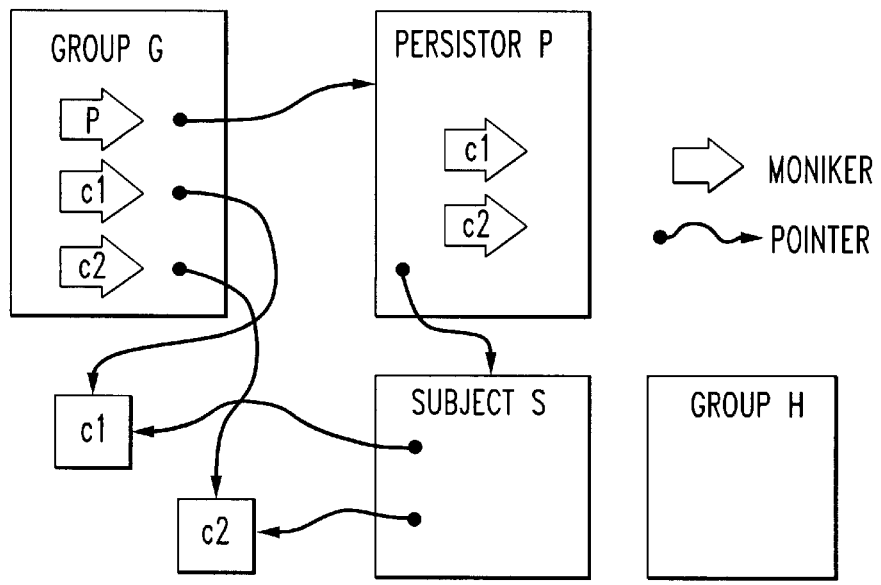
FIGS. 6A–D illustrates a group-to-group transfer in accordance with an embodiment of the present invention.
Figure 6B:
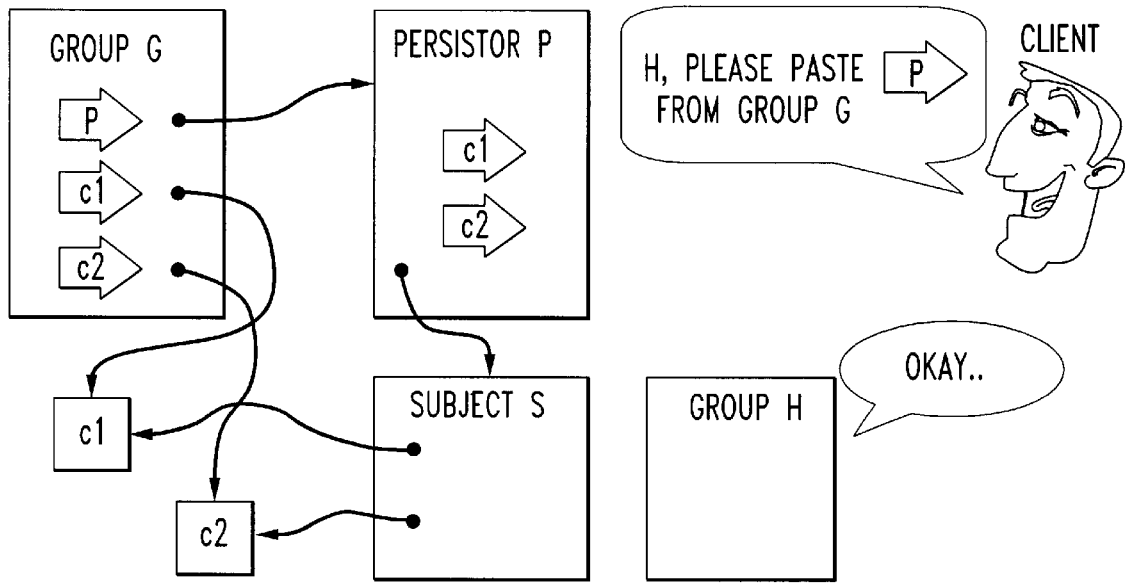
Figure 6C:
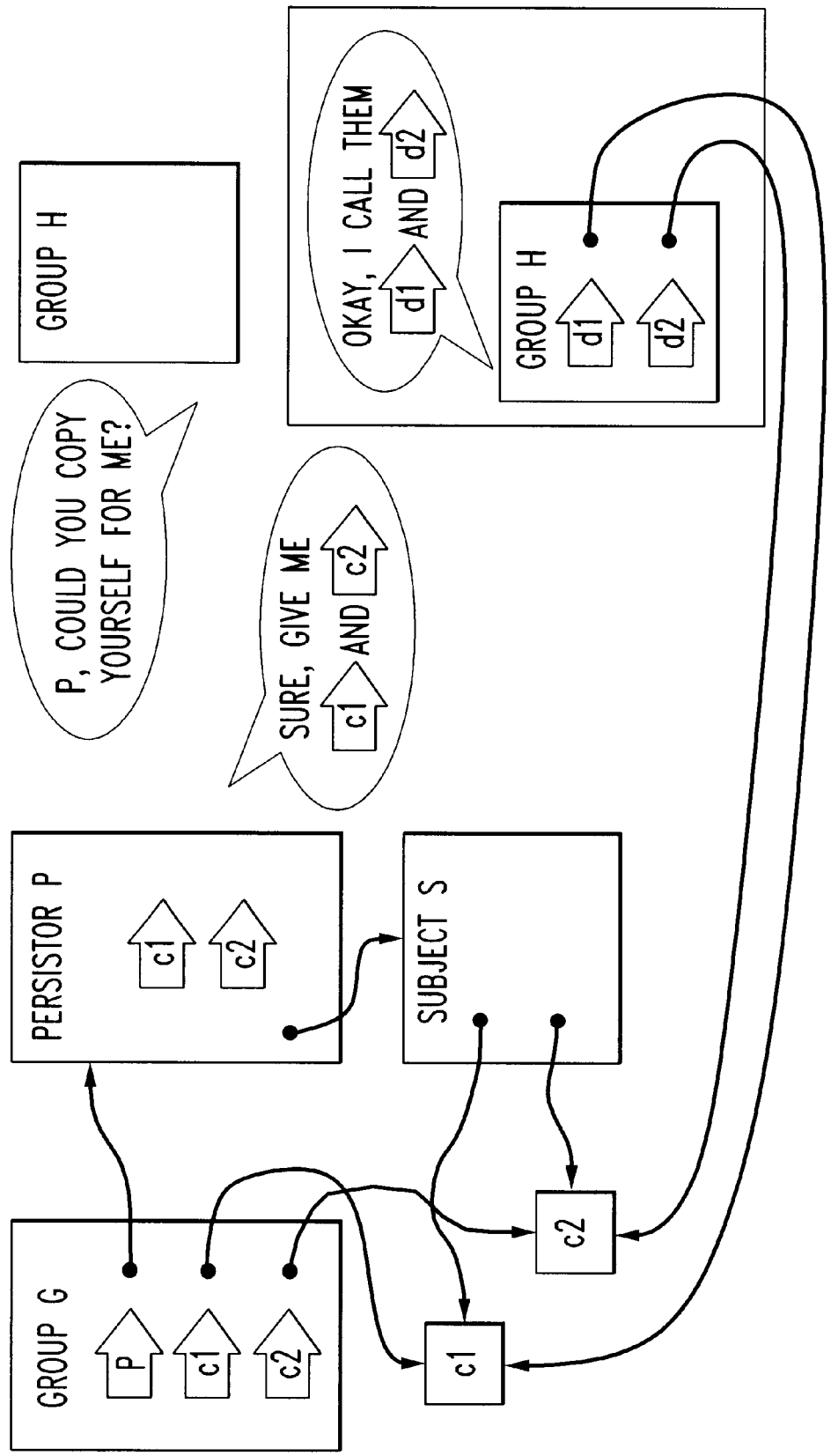
Figure 6D:
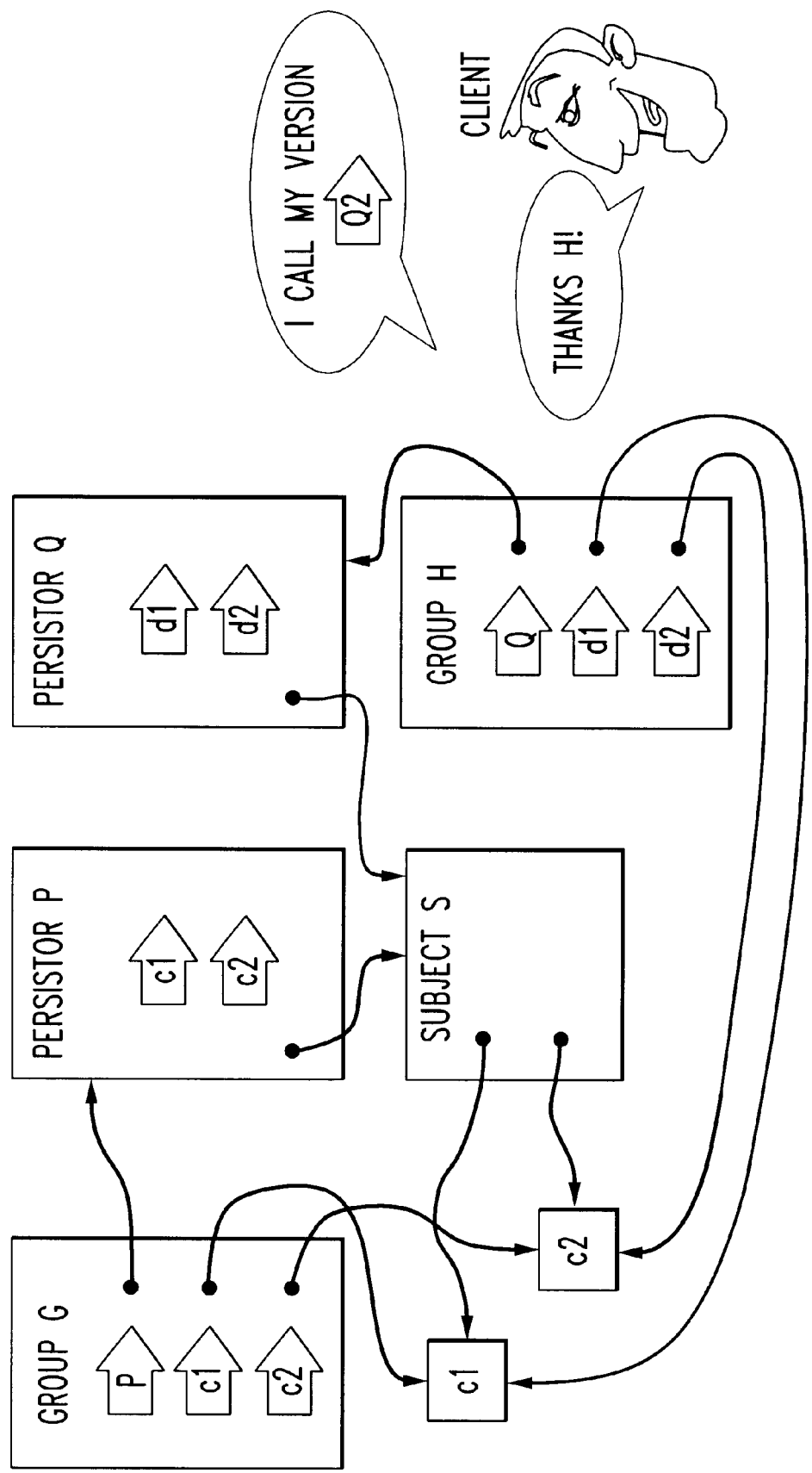

FIGS. 6A to 6D illustrate how a group-to-group transfer operates in accordance with an embodiment of the present invention. FIG. 6A shows the situation just before a clipboard copy operation. P is the persistor for S, which needs to be connected to components c1 and c2 in order to function. P holds monikers to c1 and c2 and when it loads S it binds these monikers on group G to get the needed live pointers. Group H is a empty group created to hold data for the clipboard. (For simplicity let's assume that c1 and c2 are self-contained components, which do not need persistors.) In FIG. 6B, the client (such as the Edit mode) asks to transfer P from G to H. FIG. 6C illustrates the process of pasting depencies. H binds the moniker to P and asks P for a copy. To create the copy, P asks H to transfer the components it needs. H may choose new names for the components if they are anonymous. (At this point the process would recurse if c1 or c2 had persistors.) In FIG. 6D, the process is finished up: P returns the copy to H, which adds it to its namespace under a possibly new name. H returns the new name to the client. Q has the same subject as P but it may have a different name and hold different monikers.

3. Dynagraph Application

Figure 7:
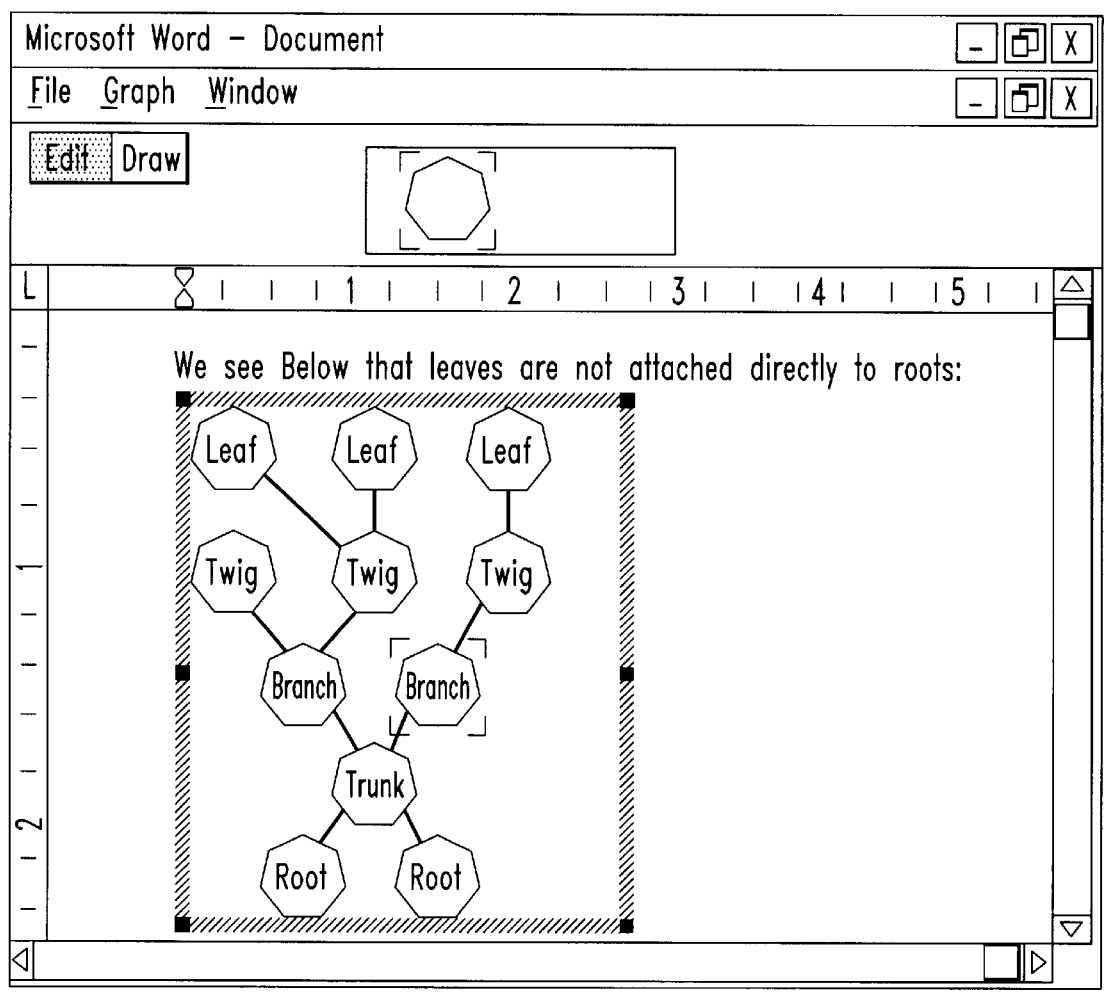
FIG. 7 is a screenshot of an example Dynagraph for Montage application.

FIG. 7 sets forth a screenshot of an application which the inventors created using the present invention called DYNA-GRAPH. Dynagraph is shown embedded in Microsoft Word. Dynagraph supports dynamic network diagrams, which consist of nodes and edges. These are represented in Dynagraph as ActiveX controls. A "shape node" control is supplied for convenience specifically for graph diagrams, but other ActiveX documents or controls have equal status. Similarly, edges are ActiveX controls that draw generalized curves; a simple non-interactive control is supplied to draw polylines and Bezier splines, but the component architecture leaves the door open for interactive edges, varying edge styles, etc. The application supports both windowed and windowless controls. Windowless controls are used for both edges and shape nodes; nodes having a naturally rectangular aspect, as do most ActiveX documents, may be either type.

The present invention permits the Dynagraph application to have the following properties: (a) any OLE control can be embeddable as a node; (b) the network editor can be embeddable in any OLE container; and (c) the network editor can support automation by external programs.

Figure 11:
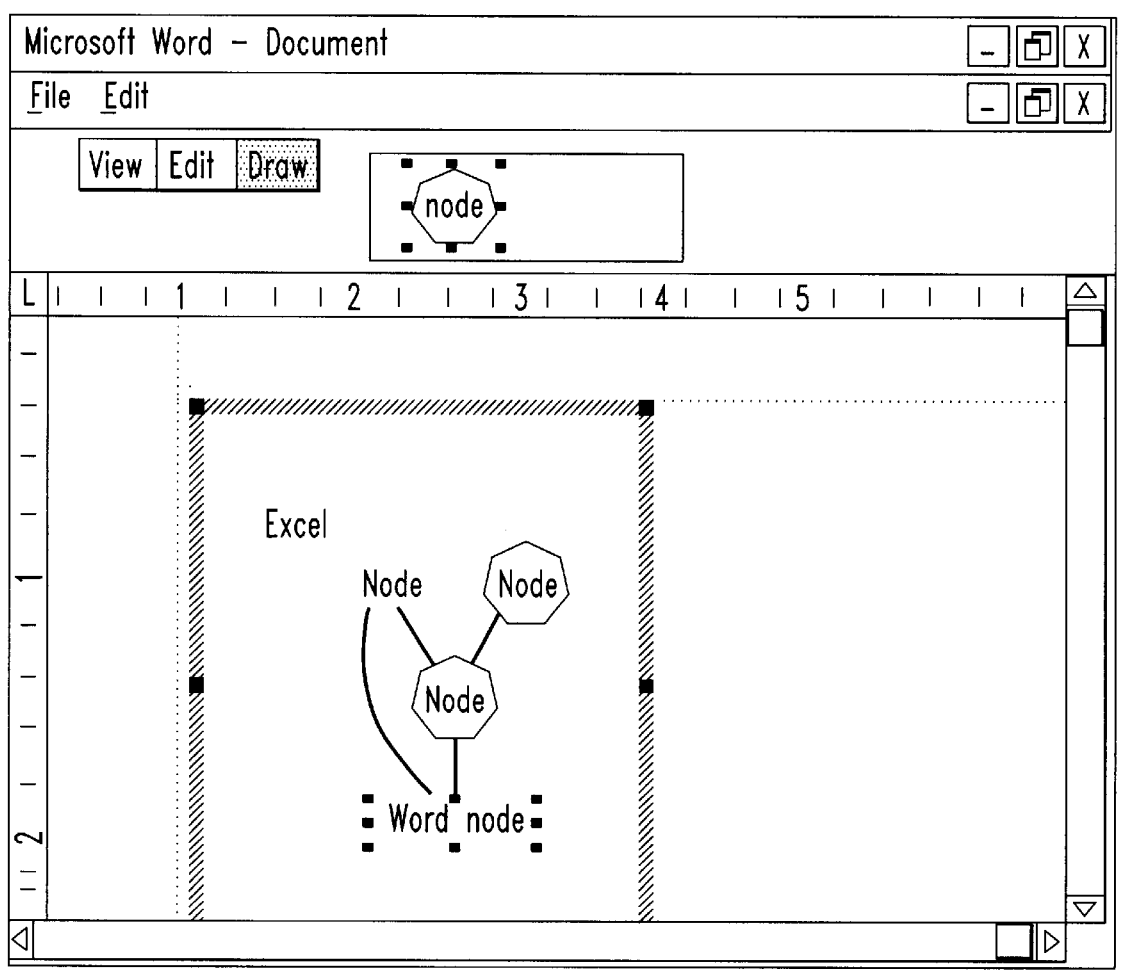
Figure 12A:
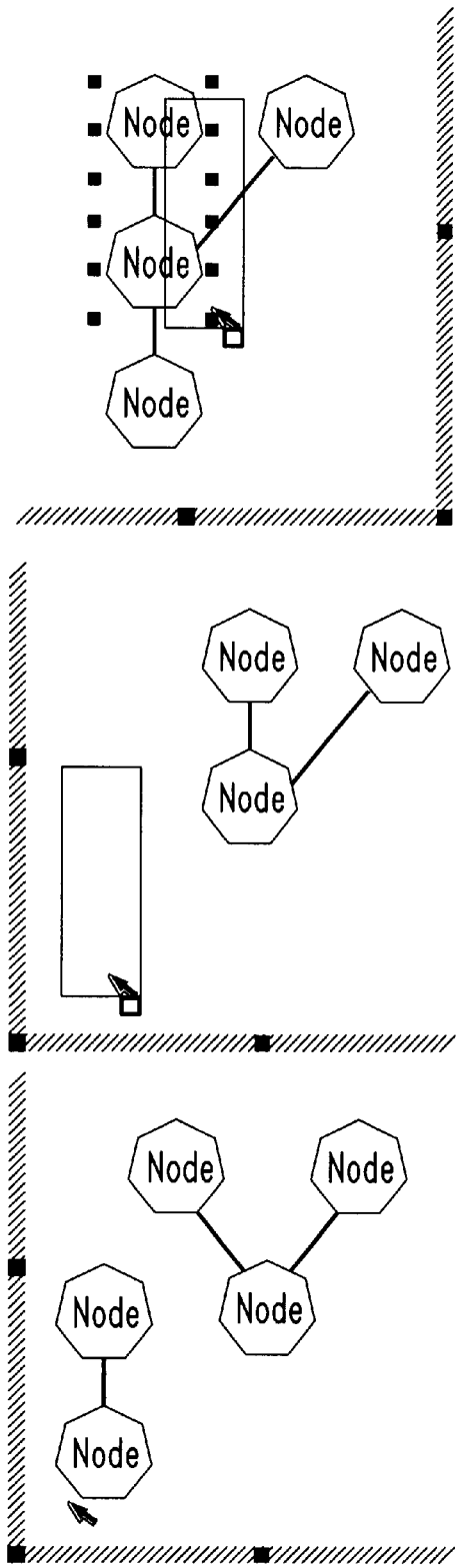

The session in FIGS. 7 and 11 actually consists of three instances of the control container: the graph view, the toolbar area, and the node palette in the toolbar. Additional diagrams and views would involve more instances. Nodes may be added to a diagram by dragging items from the palette or another application to the canvas, or by clicking on the canvas to insert the object selected in the palette. Similarly, items can be added to the palette by dragging them from the canvas or from another application (this capability arises naturally from the present architecture). For example, with reference to FIG. 12A, dragging or pasting data from another Dynagraph document inserts the data as multiple embeddings and lays it out in accordance with the local document. In FIG. 12B, dragging data from another application (here shown as Microsoft Excel) inserts the data as a single embedded object. In FIG. 12C, dragging data from Dynagraph to another application inserts the data as a single embedding.

FIG. 11 illustrates an application-specific mode, namely the "Draw" mode. Drawing (placing new objects) is a function of the user interface that will usually be specific to a class of applications, because the contained objects have various types that are presumably selected by various user-interface operations. In the Dynagraph Draw mode, clicking on the canvas creates a new mode, and dragging between two modes creates a new edge. Draw mode can work the same for all of the Dynagraph layout engines since they share a common interface. The Dynagraph application also adds a component called the "drawer", which creates embeddings and connects them to the Dynagraph layout engine.

Figure 8:
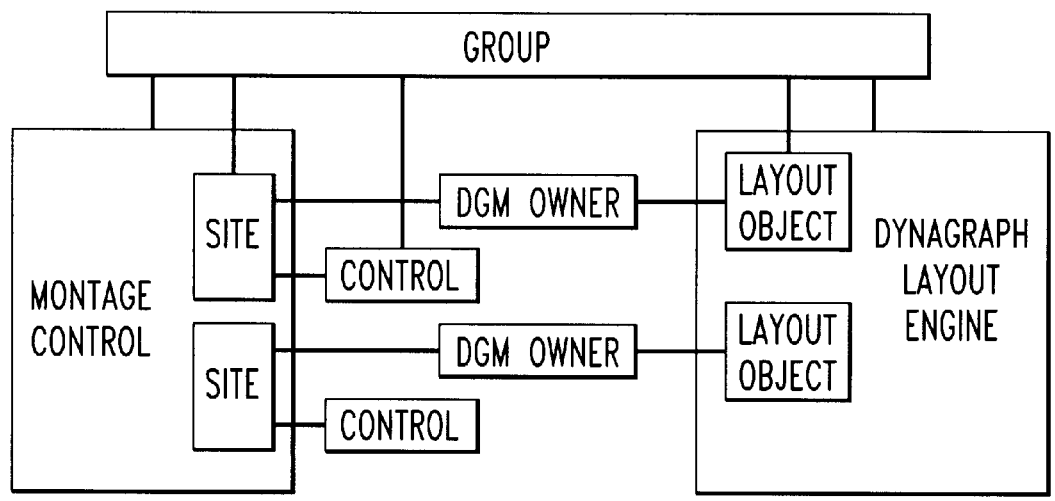
FIG. 8 is a diagram illustrating the internals of the Dynagraph application.
Figure 9:
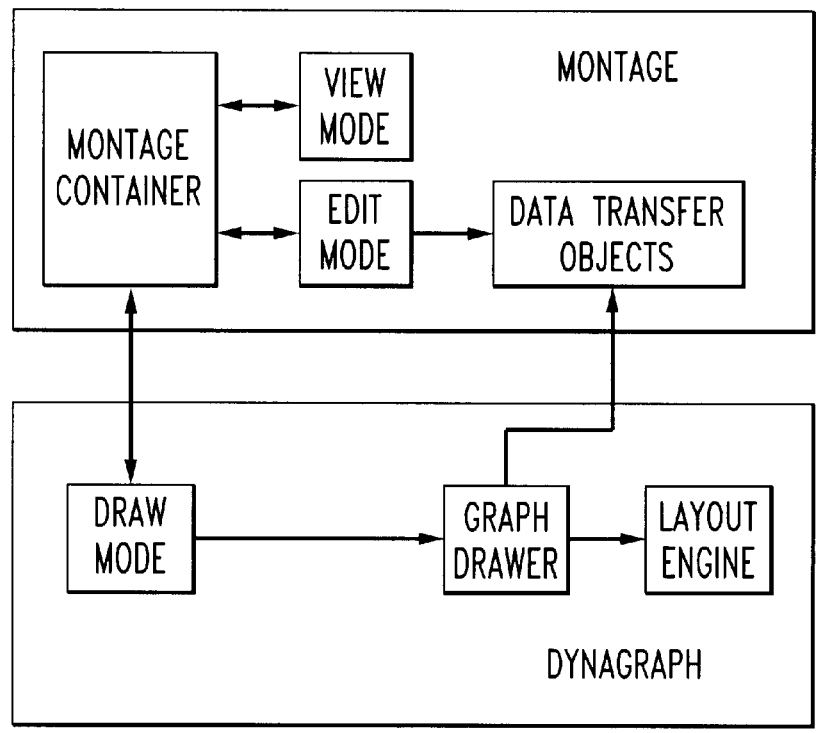
FIG. 9 is a diagram illustrating the internals of the Dynagraph application.

With reference to FIGS. 8 and 9 which illustrate the structure of the Dynagraph application, Dynagraph itself is actually a portable C library that defines an interface for incremental graph layout services. Clients can open and close diagrams and edit their contents by sending layout events to an engine. Events refer to operations on individual nodes and edges referenced by client-side descriptors, for example, "insert node vat (x,y)", "move edge e to $(x_0, y_0, x_1, y_1, x_2, y_2, \ldots)$" or "delete node v". To update live diagram displays, layout managers send events of the same type via callbacks. Note that a single request event may yield many diagram display update events, and it is also possible for an update request to be denied by a layout engine (say, if a request is inconsistent with diagram-specific constraints). Compound updates are handled by input event queues in layout engines. The library currently has managers for dynamic hierarchical layout, virtual physical ("spring") models, and incremental orthogonal layout. In order to abstract the layout engines into a separate module, the inventors created a COM wrapper for the Dynagraph library. The C structures are manipulable through COM interfaces, and the callbacks get broadcast through COM connection points. Then a separate module, called DGM (Dynagraph for Montage), manages the translation from control container events to Dynagraph events, and from Dynagraph events to commands for the control container. This design helps ensure that neither is dependent on the details of the other.

FIG. 10 shows sample automator code that inserts a node into a graph. It demonstrates most of the common operations described above: the manipulation of sites and layers, the use of transforms and connectors, and the activation model. Unfortunately, the details of coding in COM may make the code somewhat cryptic to the uninitiated. The syntax of the code requires some explanation: (1) All COM interfaces (which by convention start with the letter "I") extend the interface IUnknown, which provides methods for reference counting and querying for interfaces on the object. ATL's CComPtr and CComQIPtr template classes ("qi" is a macro based on CComQIPtr) abbreviate the use of these methods by automatically calling the IUnknown methods as necessary. (2) All COM methods return error codes that should not be ignored, so the RUN macro echoes errors by returning them, effectively treating them as exceptions. (3) Since COM only supports methods and not properties, it recommends that get and set methods be prefixed with "get_" and "put_" respectively. ("new_" is an analogous convention in the code for methods that create objects that share memory with their parents.) (4) All classes that do not share memory have 128-bit IDs (whose constants start with "CLSID_"), and are created with the system call CoCreateInstance.

The code starts with the creation of a new site in the container. Sites are the only way to refer to contained objects; they represent the work that the application is doing to keep a contained object afloat. Next it places the site in the main layer, which is the lowest layer in the Z order in the standard configuration of the control container. The call to CoCreateInstance instantiates the control which will provide the visual part of the node. This control may also come from a data transfer triggered by a drop or paste operation. (In Graph Draw Mode, the data source is the active selection in the palette.) Next the code tells the control its size through the standard ActiveX interface IOleObject. The control does not have to accept this size (i.e. SetExtent may return an error code), so code within the connector asks the size through GetExtent rather than trusting the argument value. This illustrates a recurrent design theme in ActiveX component design: just about every method call is a request that can be interpreted or ignored, a callback or future query works better than remembered state.

As described before, the Dynagraph application has three levels of objects. The next section of code creates both Dynagraph and DGM objects. The DGM object is made aware of the two sides it is mediating through the interfaces INeedOnePointer (of the Group model) and IObjectWithSite (of standard ActiveX). It is unfortunate that such non-specific methods must be used to set up the connector, but using generic interfaces makes persistence simpler. Specifically, INeedOnePointer makes it simple to define a generic persistor for the common case where the persisted object needs to be connected to exactly one other object when it is loaded, or in order to load. And IObjectWithSite makes it possible for the site persistor to tell the owners their property, without knowing what the site means to them. When it is told its site, the connector sets itself up as a sink of the IMCCSiteOwner event interface, so that it handles all layout events.

Now that the structure is in place, it is possible to actually begin the layout. The code here tells the Dynagraph node object directly what the position is; it could instead use the event interface on the site, but it can be pretty certain at this point that the Dynagraph node object will handle the event. First it must translate the coordinates, though: the engine expects canvas coordinates, expressed in units of 0.01 mm (HIMETRIC), not the window coordinates the mode is working from. So this code fetches the transform object (another modular component) from the container, and asks that to do the translation. Finally the node can be shown. The code here uses the IMCCSiteOwner event interface on the site to issue a show request. We omit the code for clarity, but the function intend( ) enumerates the sinks of that interface on the site, and calls IMCCSiteOwner::Intend( ) on each.

The present invention was inspired by the inventors' attempt to port a graph editor, DOTTY, written for Unix X Windows to Microsoft Windows. After coding the file selector, text entry and other widgets in win32 graphics, the port lacked even basic Windows compatibility such as access to native print drivers (let along higher levels of tool integration such as the ability to embed graphics diagrams in text documents or to incorporate multimedia controls in diagrams). Users need a much higher level of tool integration, such as the ability to embed graph diagrams in text documents, or to incorporate multimedia controls in diagrams. Moreover, the facts of graph layout made using OCX96, with its windowless controls, very appealing: nodes are usually non-rectangular and it would be disastrously impractical to put opaque rectangles around edges. At the time, however, MFC did not support containment of windowless controls making it clear that the inventors would need to write any support for windowless controls from scratch.

Abandoning MFC, the inventors instead asked the main design question: if ActiveX defines a containment relation, what is the abstract data type for that relation? The present invention's answer is to factor out all interaction, layout, and persistence, as for example a function for ordering objects is factored out of an ADT for dictionaries. Other solutions have been proposed recently. Dynamic HTML, which was being developed concurrently with the present invention, is an attempt to provide an object model for the Hypertext Markup Language (HTML) as used in document browsers such as Netscape Navigator or Internet Explorer. The model exposes page elements as objects that can be manipulated as the result of a specified event, such as the detection of a mouse and/or keyboard event. Text and graphics in the Web page can be treated as objects and added or deleted or modified on the fly. Although Dynamic HTML does move layout policy out of the core container and into client programs; nevertheless, the browsers do not have persistence models, making them more presentation oriented rather than document oriented. Visual Basic and almost all other OLE applications with macro-scripting languages also can function as general containers, but developers may find themselves fighting with the layout and other peculiarities of the document data type. In contrast, the document type of the preferred embodiment of the present invention is simply an ordered list of controls. The familiar OLE GUI is modeled in auxiliary controls and components.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description described embodiments based on the Microsoft ActiveX/OLE protocols. However, the principles of the present invention could be extended to other object-based technologies. Such an extension could be readily implemented by one of ordinary skill in the art given the above disclosure.

What is claimed is:

1. A method of providing a user interface for a container application comprising the steps of:

receiving a user input event at the container application; and forwarding the user input event to a contained transparent windowless object for processing which acts as a user interface for the container application, wherein the user input event is forwarded to the contained windowless object only if no active contained object processes the user input event.

* * * * *